United States Patent [19]

Nakai et al.

[11] Patent Number: 5,210,561
[45] Date of Patent: May 11, 1993

[54] LENS-FITTED PHOTOGRAPHIC FILM PACKAGE AND FILM FEEDER AND PACKAGE HOLDER FOR FILM PROCESSOR

[75] Inventors: Norihiro Nakai; Tatsuya Mochizuki; Toshiyuki Ogura; Takashi Sugimoto, all of Kanagawa, Japan

[73] Assignee: Fuji Photo Film Co., Ltd., Kanagawa, Japan

[21] Appl. No.: 924,996

[22] Filed: Aug. 5, 1992

Related U.S. Application Data

[62] Division of Ser. No. 717,344, Jun. 18, 1991.

[30] Foreign Application Priority Data

Jun. 18, 1990 [JP] Japan ................................ 2-159341
Jul. 9, 1990 [JP] Japan ................................ 2-180992
Jul. 13, 1990 [JP] Japan ................................ 2-75110
Jul. 30, 1990 [JP] Japan ................................ 2-81074

[51] Int. Cl.⁵ ............................................ G03D 13/00
[52] U.S. Cl. .................................... 354/297; 354/319
[58] Field of Search ............... 354/297, 319, 320, 321, 354/322

[56] References Cited

U.S. PATENT DOCUMENTS

| 4,797,698 | 1/1989 | Uenaka et al. ............... 354/319 X |
| 4,884,087 | 11/1989 | Mochida et al. ................... 354/75 |
| 4,954,857 | 9/1990 | Mochida et al. ................... 354/75 |
| 5,148,198 | 9/1992 | Shiba ............................... 354/319 |

FOREIGN PATENT DOCUMENTS

0242817 10/1987 European Pat. Off. .
2210699 6/1989 United Kingdom .

Primary Examiner—Donald A. Griffin
Assistant Examiner—Howard B. Blankenship
Attorney, Agent, or Firm—Young & Thompson

[57] ABSTRACT

After exposure of all frames of a film contained in a lens-fitted photographic film, a wall portion of a film take-up chamber of the film package is removed, thereby to provide a film removal opening, through which the exposed film is drawn out directly from the film package. In the film take-up chamber, a cassette or a take-up spool is disposed for winding up the exposed film. So as not completely to wind the exposed film into the cassette, a film arresting member is provided. A film package holder disposed at a film entrance of a film processor can selectively hold the film package or a film cassette taken out from a camera.

4 Claims, 15 Drawing Sheets

F I G. 4
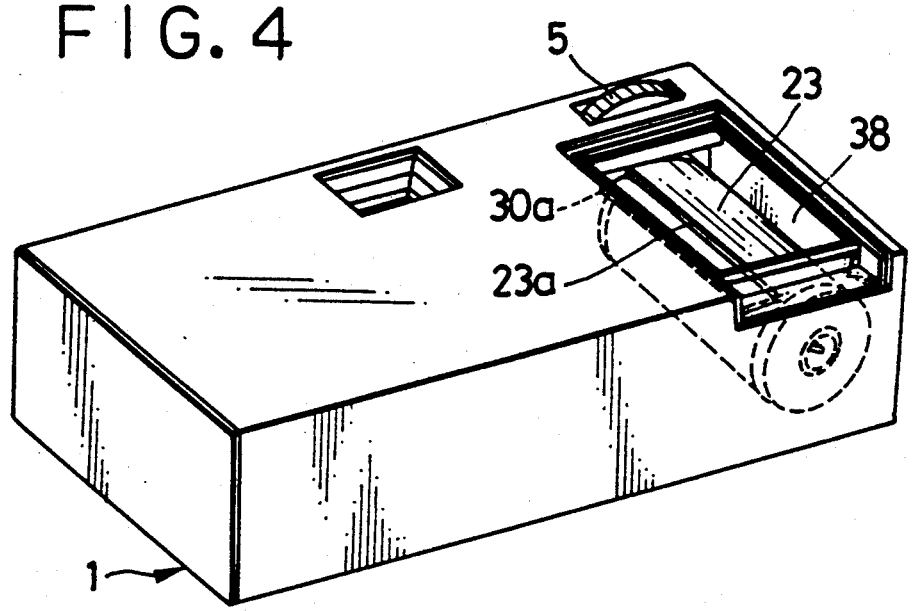
F I G. 5
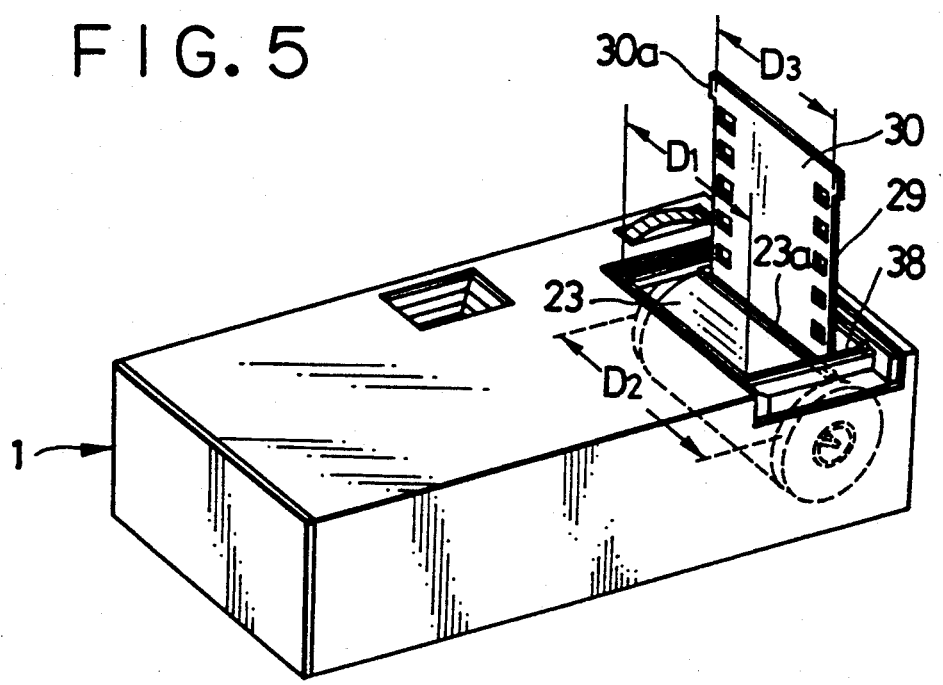

LENS-FITTED PHOTOGRAPHIC FILM PACKAGE AND FILM FEEDER AND PACKAGE HOLDER FOR FILM PROCESSOR

This application is a division of application Ser. No. 07/717344, filed Jun. 18, 1991.

BACKGROUND OF THE INVENTION

1. Field of Invention

The present invention relates to a lens-fitted photographic film package in which exposure mechanisms are incorporated, as well as to and a package holder and film feeder for a film processor which are intended to use in case photographic films contained in lens-fitted photographic film packages are to be developed together with photographic films contained in conventional film cassettes.

2. Prior Art

Lens-fitted photographic film packages (hereinafter called simply film packages), in which a photographic film is previously loaded and simple exposure mechanisms are incorporated, are widely known, which are intended to make it possible to take pictures whenever desired without buying or carrying about a camera. For example, Japanese Unexam. Patent Publ. No. 64-544 discloses a film package which is previously loaded with a 135-type cassette film (ISO: 1007-1979) in light-tight fashion.

In this type of film package, the film is wound back into the film cassette by one frame after each exposure, so that the entire length of film has been taken up in the film cassette when all the available frames have been exposed. Thereafter, the film package itself is forwarded to a photofinisher. In order to take out the film cassette containing the exposed film, the photofinisher disassembles or partially breaks the film package, or detaches a light-shielding cover of a film take-up chamber, in either case, in the light. The film cassette is then subjected to a conventional photofinishing and printing process, and the photofinisher returns the developed negative film and resulting photographic prints to the customer.

However, it is inefficient to remove the film cassette from the film package before pulling out the exposed film from the film cassette. Furthermore, because the exposed film is completely wound into the film cassette in the film package, it is necessary to disassemble the film cassette or to use a device for catching the leader portion of the film so as to pull out the exposed film from the cassette. Therefore, pulling out the exposed film from the cassette itself is rather cumbersome.

Generally, the photofinisher is required to process also photographic films contained in film cassettes removed from conventional cameras. But because it is necessary to remove the film cassette from the film package, the film packages are sorted out and dealt with separately from conventional film cassettes.

OBJECTS OF THE INVENTION

In view of the foregoing, a principal object of the present invention is to provide a film package in which an exposed film can be directly pulled out from a film package, and thus the process for removal of the exposed film is simplified.

Another object of the present invention is to provide a film package in which the reuse of the film cassette as well as of the package housing is possible.

A further object of the present invention is to provide a film feeder for a film processor and a package holder for the film processor, which make it possible to develop films pulled out directly from film packages together with films pulled out from film cassettes.

SUMMARY OF THE INVENTION

To achieve the above objects, the film package of the present invention is provided on the rear side of the film take-up chamber with a film removal opening through which the exposed film can be drawn out. According to a preferred embodiment of the invention, the film take-up chamber contains a cassette for receiving the exposed film therein, and the film take-out opening is provided by removing a part of the film take-up chamber. The film removal opening is of a size that is smaller than the cassette so as to prevent the slipping-out of the cassette, but is large enough to permit drawing the exposed film through the film take-out opening.

Preventing the film end from being wound into the cassette makes it needless to pull out the film end from the cassette. This can be achieved by making the film end wider than the mouth of the cassette. It is also preferable for this purpose to form an arresting hole in the film end that is aligned with perforations of the film but is larger than any one perforation, and to provide a film arresting member in the film take-up chamber, which is capable of engaging in only the arresting hole. It is also possible to use a film arresting member having a film detecting arm and a claw arm connected to each other and rotating together. The claw arm engages with the perforation when the film detection arm moves into a cut-out formed in the film end.

The film package holder of the present invention comprises a package holding portion for holding a film package therein, from which an end of an exposed film is pulled out through a film outlet opening thereof, and a cassette arresting portion for supporting a peripheral surface of a film cassette thereby to arrest the cassette at the film entrance of the film processor while an end of an exposed film contained in the film cassette is connected to film pull-out means. The package holder makes it possible to perform photofinishing of the film package together with photofinishing of conventional film cassettes.

A film feeder for a film processor of the present invention comprises a leader sheet transporting device for transporting a leader sheet to a photographic processing section; a plurality of film package holders each having a film package holding portion for positioning a film package at a film entrance of the film processor, and a cassette arresting portion for arresting a film cassette when an end of an exposed film pulled out from the film cassette is connected to a leader sheet which is inserted in a leader sheet transporting means. A mounting device is provided for mounting the film package holders such that these holders are disposed at the film entrance of the film processor, aligned in a direction perpendicular to the film transporting direction, and movable in the film transporting direction independently of each other. A movement detecting device detects movement of each package holder in the film transporting direction; and a plurality of cutters are each disposed near the film entrance associated with one package holder so as to cut the exposed film from one of the film package holders.

According to the present invention, the exposed film can be directly pulled out from the film package, so that it is unnecessary to remove the cassette form the film package. Therefore, the operation of removing the exposed film is greatly simplified. Besides this advantage, since the empty cassette remains in the film housing of the film package, the film package maker can recover both the film housing and the cassette. This contributes greatly to the reuse of materials as well as to environmental protection.

Furthermore, because the film end is arrested before being wound back into the cassette, it is unnecessary to hook and pull out the film end from the cassette by means of a conventional film catching device or the like. In case the film package contains no cassette, that is, the exposed film is wound directly into the film take-up chamber, since the film end is arrested at the predetermined position, it is easy to pick up the film end in the darkroom.

The film package holder of the invention can selectively hold a film package or a film cassette, so that it is possible to perform photofinishing without discriminating between film packages and film cassettes. Furthermore, the film package holder is movable in a film transporting direction, so that the film end will be easily detected by detecting the movement of the film package holder. When the film cannot be drawn out any more, then the film is cut by a cutter. Therefore, it becomes possible automatically to handle not only a conventional film cassette wherein the contained film is secured at its one end to the spool thereof, but also the film package of the present invention.

BRIEF DESCRIPTION OF THE DRAWINGS

The above and other objects and advantages of the invention will become apparent from the following description of preferred embodiments when read in conjunction with the accompanying drawings, wherein like reference characters designate like or corresponding parts throughout the several views, and in which:

FIG. 4 is a rear perspective view of the film package with a rear portion of the film take-up chamber torn off therefrom;

FIG. 5 is a view similar to FIG. 4 but with the film end pulled out through the film exit opening;

DETAILED DESCRIPTION OF THE PREFERRED EMBODIMENTS

Figure 1:
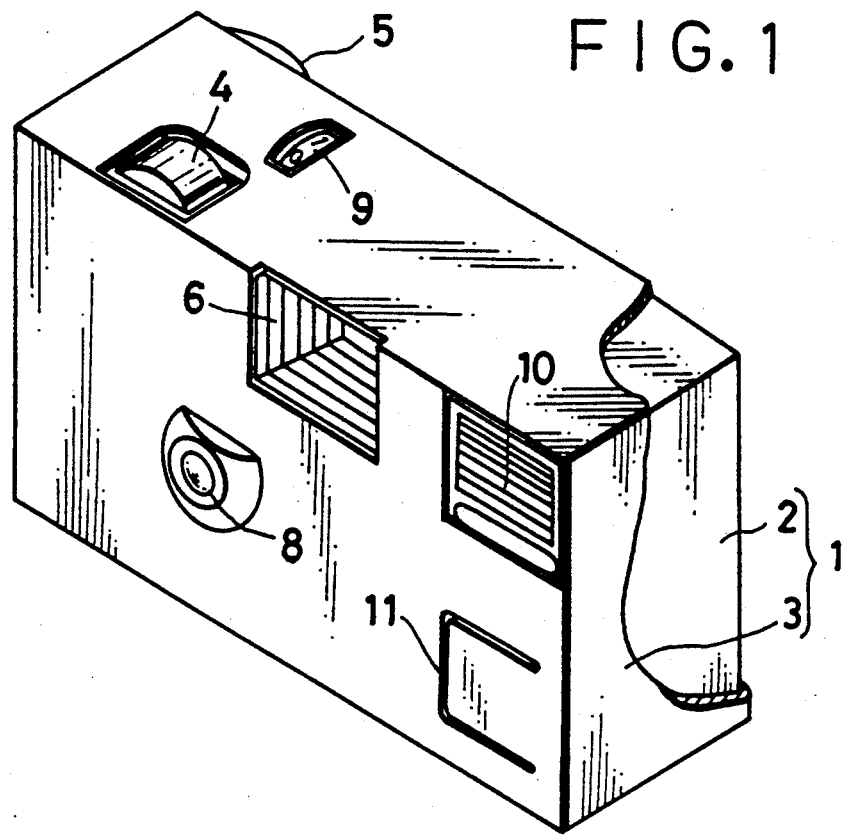
FIG. 1 is a front perspective view of a film package with its film housing encased in an outer casing.

In FIG. 1 a film package 1 comprises a film housing 2 having exposure mechanism and an outer casing 3 in which the film housing is encased. The outer casing 3, which is intended to impart a decorative appearance to the film package 1, is a cardboard box or the like having ornamental patterns and information printed thereon. The outer casing 3 is formed with openings for exposing a shutter release button 4, a film advancing wheel 5, a finder window 6, a look-in window 7 (see FIG. 2), a taking lens 8, a film frame counter 9 and a flash window 10, so that the user can operate the film package 1 without removing the outer casing 3. The outer casing 3 further has a slit 11 for facilitating depression of a flash charge switch (not shown).

Figure 2:
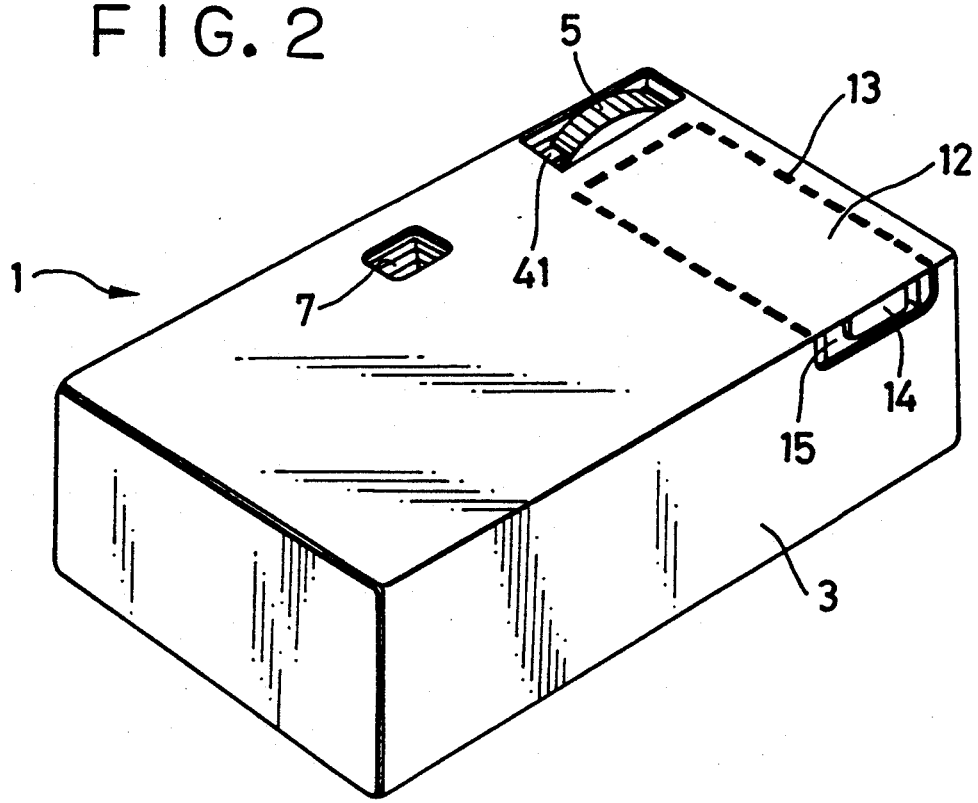
FIG. 2 is a rear perspective view of the film package shown in FIG. 1.

As shown in FIG. 2, a part 12 of the rear side of the outer casing 3 is adapted to be torn off so as to make it possible to remove an exposed film directly from the housing 2. A perforation line 13 and a cut-out 15 leaving a pull tab 14 are provided to help in tearing off the part 12. The perforation line 13 and the cut-out 15 are not necessary if the outer casing 3 is removed from the housing 2 for taking out the exposed film. It is possible to eliminate the outer casing 3 as having no bearing on photography, or to adhere a decorative printed paper to a part of the outer surface of the housing 2.

Figure 3:
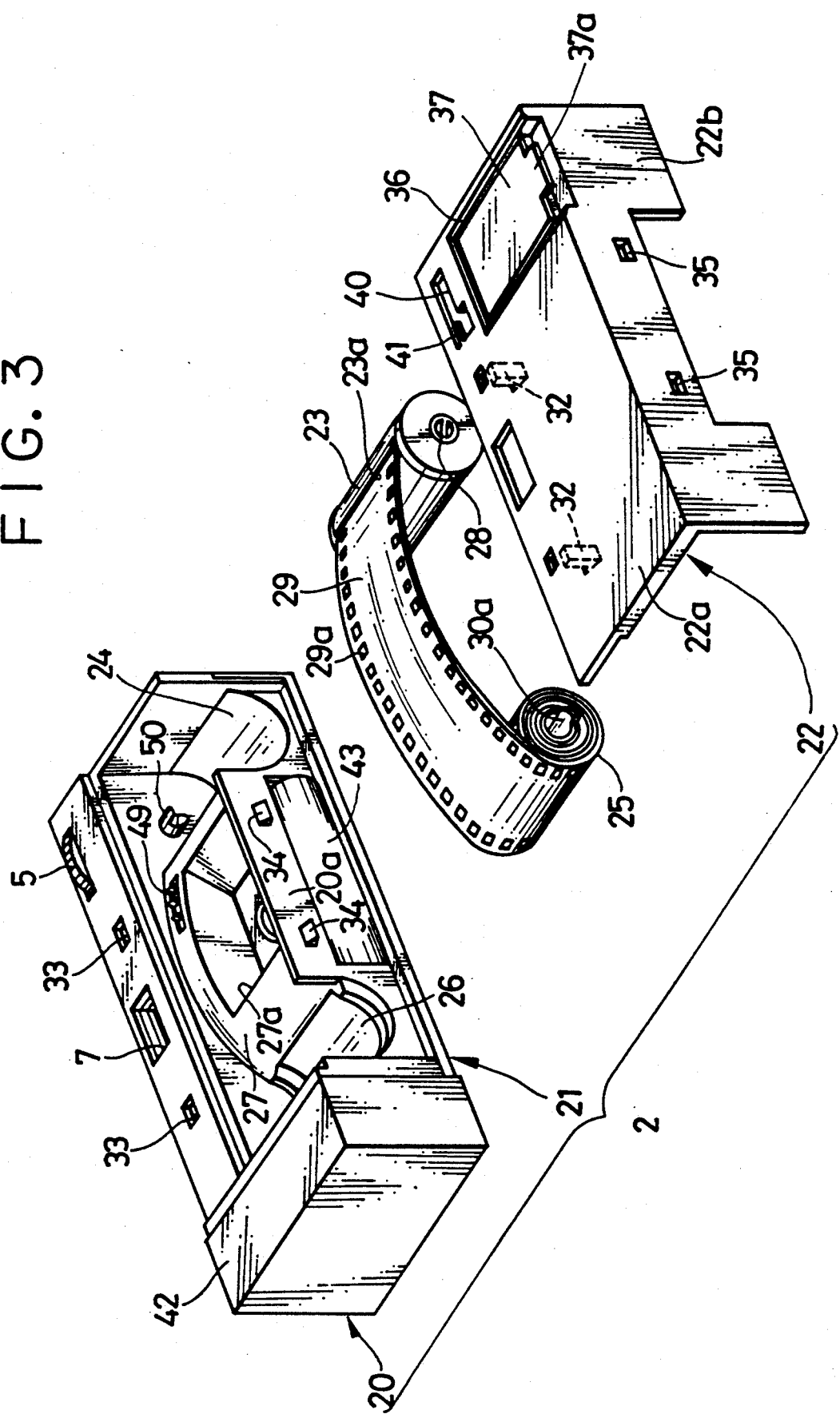
FIG. 3 is an exploded perspective view of the film package.

Referring to FIG. 3, the film housing 2 comprises a main body 20, a front cover 21 attached to the front of the main body 20, and a rear cover 22 attached to the rear of the main body 20. The main body 20, the front cover 21 and the rear cover 22 are each formed of one-piece molded plastic. The main body 20 has mounted thereon mechanisms necessary for photographing such as the taking lens 8, a shutter mechanism, a film advancing mechanism, and the film frame counter 9. The main body 20 is also provided with a film take-up chamber 24 for accommodating a film cassette 23, a film supply chamber 26 for accommodating a roll 25 of unexposed film, and an exposure frame 27 disposed between these chambers. It may be possible to provide a rotatable shaft in the film supply chamber 26, whose lower end protrudes from the film supply chamber 26, so as to wind up the unexposed film from the film cassette on the shaft by rotating the lower end of the shaft.

The film cassette 23 contains an unexposed film 29 whose trailing end is fitted to a spool 28 of the film cassette 23. Before loading the film cassette 23 in the main body 20, the unexposed film 29 is pulled out from the film cassette 23 and wound into the roll 25 with its leading end 30 disposed in the center of the roll 25. The exposure frame 27 is curved so as to correct the distortion of the taking lens 8, and has an exposure opening 27a for guiding light passing through the taking lens 8 toward the film 29.

The rear side of the main body 20 and the bottom ends of the chambers 24 and 26 are open. The rear cover 22 comprises a back wall portion 22a and a bottom wall portion 22b for closing these open portions of main body 20 light-tightly, wall portions 22a and 22b being so arranged as to form an L-shaped as a whole. A pair of engaging claws 32 formed on the back wall portion 22a are in engagement with a pair of engaging holes 33 formed in the main body 20, while a pair of engaging holes 35 formed in the bottom wall portion 22b are in engagement with a pair of engaging claws 34 formed on a bottom portion 20a of the main body 20.

The rear cover 22 is formed with a groove 36 surrounding on three sides an area 37 corresponding to the film take-up chamber 24. The groove 36 is V-shaped. The area 37 surrounded by the groove 36 forms a tear-off lid having a tab 37a formed integrally in a free edge thereof. When pulling up the tab 37a, the lid 37 is torn off along the groove 36, thereby to provide a rectangular film removal opening 38 shown in FIG. 4. The rear cover 22 is formed with a slot 40 through which the film advancing wheel 5 protrudes. The slot 40 has a reversal preventing claw 41 for preventing the film advancing wheel 5 from rotating in a direction opposite to the film advancing direction.

Designated by 42 and 43 are a flash unit chamber and a battery for the flash unit, respectively.

Figure 6:
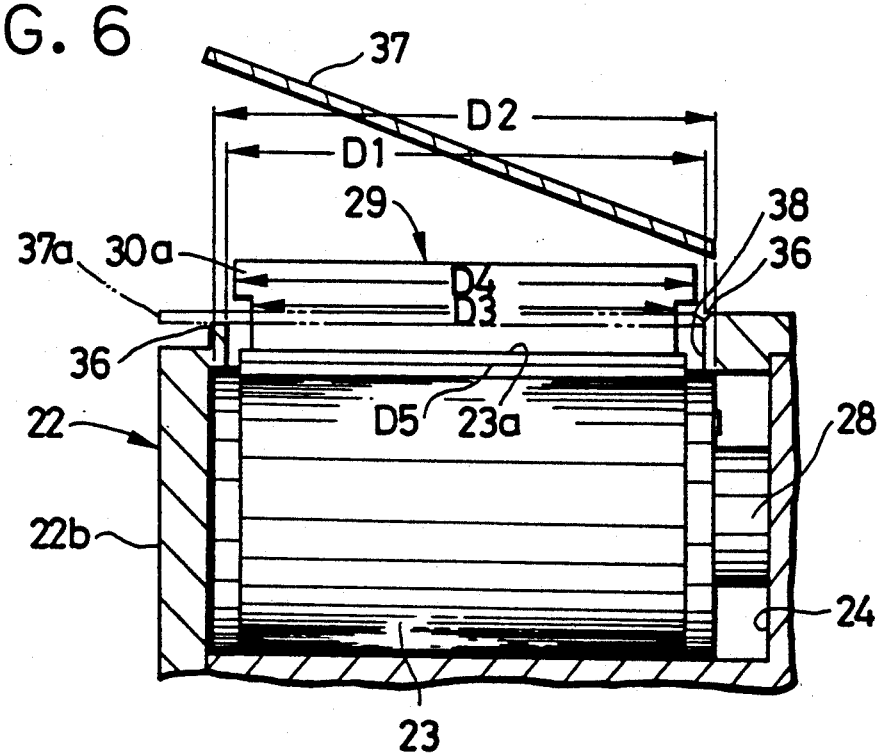
FIG. 6 is a sectional view showing the film take-up chamber.

As shown in FIG. 5, the length D1 of the film removal opening 38 is less than the length D2 of the film cassette 23, but is greater than the width D3 of the film strip 29. Therefore, the film strip 29 can be pulled out through the film removal opening 38, but the film cassette 23 cannot. The leading end 30 of the film strip 29 is formed with projections 30a on both side edges, such that the width D4 of the leading end 30 is greater than the width D5 of mouth 23a of the film cassette 23 (see FIG. 6). As the result, the leading end 30 cannot be wound into the film cassette 23 even after the completion of exposure of all the frames.

Figure 7:
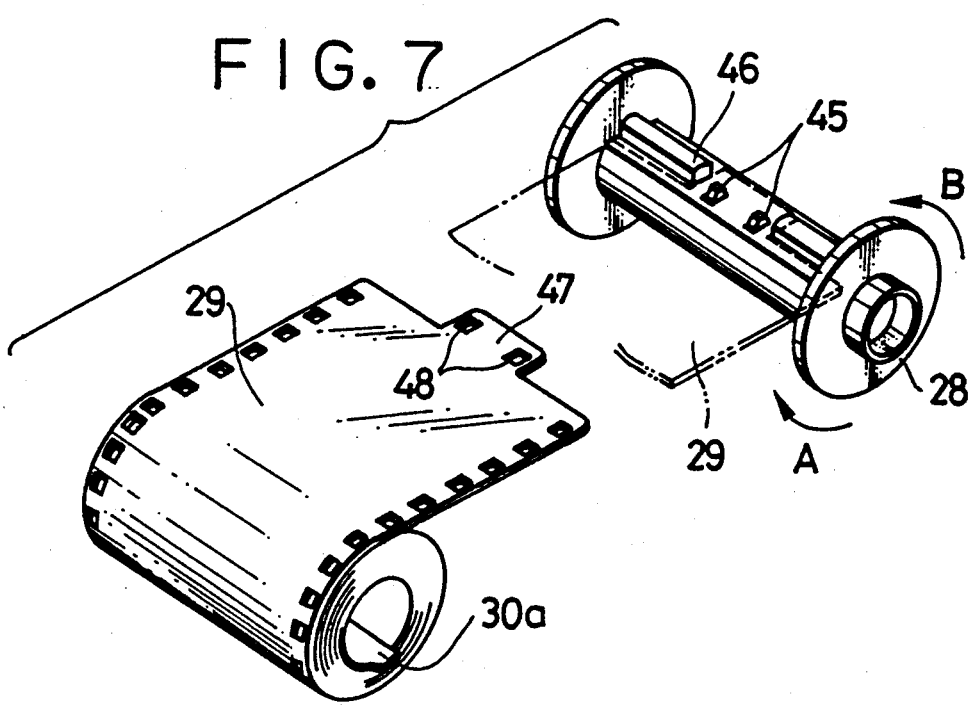
FIG. 7 is a perspective view showing the relationship between the spool of the cassette and the film end.

The spool 28 is rotatably mounted in the film cassette 23, and has a pair of claws 45 and a pair of ridges 46 formed on a flat cut-out surface of the spool 28, as shown in FIG. 7. The top surface of the ridges 46 is disposed in the same cylindrical contour as the peripheral surface of the spool 28, so as to permit the film 29 to be wound in smoothly curved turns on the spool 28. On the other hand, the height of the claws 45 is equal to or less than that of the ridges 46. On the trailing end of the film 29, there is formed a lug 47 with two holes 48, which is placed on the flat cut-out surface between the two ridges 46 with its holes 48 caught on the claws 45.

So as to wind the exposed film 29 back into the film cassette 23, the spool 28 is rotated in a direction A (FIG. 7) in which the engagement between the claws 45 and the holes 48 is maintained, so that the film 29 will be tightly wound on the spool 27. When the film 29 is then pulled out from the film cassette 23 through the mouth 23a, the spool 28 is rotated by the movement of the film 29 in the reverse direction B. Since the holes 48 disengage from the claws 45 when the spool 28 rotates in the direction B, the film 29 will be separated from the spool 28 at the end without the need for cutting the film 29.

The operation of the above-described embodiment is as follows:

To perform photography, the film package 2 is operated without removing the outer casing 3. Upon depression of the shutter release button 4, the shutter is actuated to let the exposure light passing through the taking lens 8 fall upon the film 29 disposed behind the exposure opening 27a. When the film advancing wheel 5 is rotated after the exposure, the spool 28 of the cassette 23 is rotated in the A direction through a fork 50 (FIG. 3), so that the exposed portion of the film 29 is wound back into the cassette 23, while an unexposed portion is positioned behind the exposure opening 27a. While the film 29 is thus advanced by one frame, a sprocket 49 engaging with perforations 29a of the film 20 is rotated by the movement of the film 29, thereby setting the shutter in the cocked position and, at the same time, advancing the film frame counter 9 by one graduation. When the film 29 has been advanced by one frame, a conventional lock mechanism is actuated to prevent further rotation of the film advancing wheel 5 until after the next exposure is made.

When the film advancing wheel 5 is rotated after the exposure of the last frame, the leading end 30 of the film 29 leaves the sprocket 49, so that the sprocket 49 will not thereafter be rotated. Therefore, the lock mechanism is not actuated, and the shutter is not charged. As a result, the shutter cannot be actuated even if the shutter release button 4 is depressed. Thereafter, when the film advancing wheel 5 is further rotated, the leading end 30 is stopped by its projections 30a engaging the ends of the mouth 23a of the film cassette 23, thereafter film 29 cannot be wound further even by rotating the film advancing wheel 5.

When all the available film frames have been exposed, the film package is forwarded to a photofinisher for developing and printing. In the photofinishing laboratory, the reversal preventing claw 41 is broken or bent using an appropriate tool, so as to enable the film advancing wheel 5 to rotate reversely. The, in the case of the FIG. 2 embodiment, the tab 14 is pulled so as to tear off the part 12 of the outer casing 3 along the perforation line 13. In the case of the FIG. 3 embodiment, tab 37a is pulled so as to tear off the lid 37 from the rear cover 22 along the groove 36, whereby the film removal opening 38 is left as shown in FIG. 4. Since the leading end 30 protruding from the mouth 23a of the cassette 23 extends parallel to the back wall portion 22a, the cassette 23 is rotated to position the mouth 23a in the middle of the film removal opening 38, so that the exposed film can be pulled out in a direction perpendicular to the back wall of the film package. It is possible to extend the lid 37 to include the claw 41 such that the claw 41 is torn off from the rear cover 22 together with the lid 37.

Figure 18:
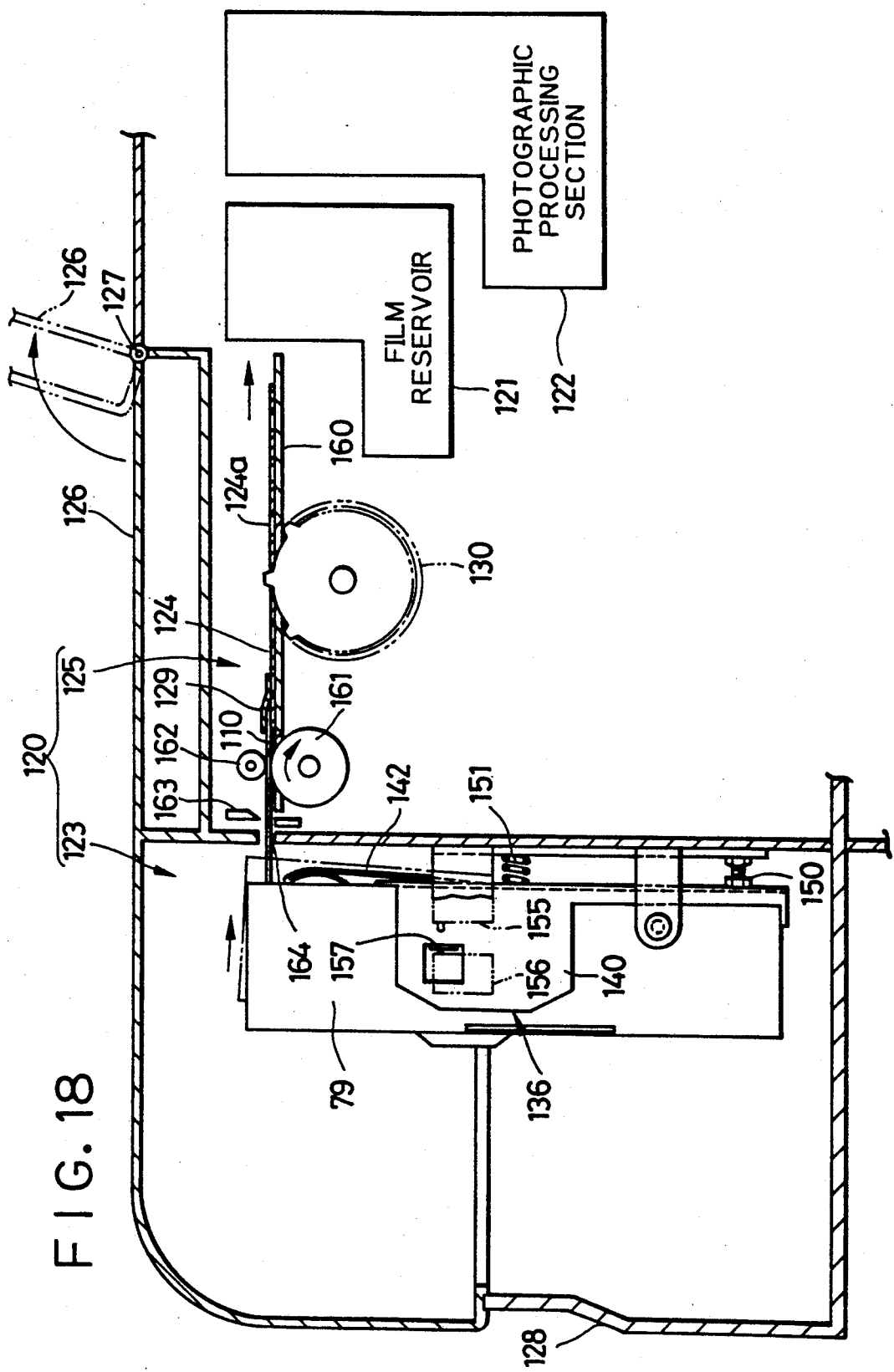
FIG. 18 is a schematic cross-sectional view of a film processor provided with a film package holder.

The leading end 30 is pulled out a short distance from the cassette 23, so as to permit positioning it in a film processor as shown in FIG. 18. In the film processor, a leader sheet is coupled to the leading end 30, and is fed into a processing section, so that the exposed film 290 is pulled out form the cassette 23 while the spool 28 and the film advancing wheel 5 are rotated in the reverse direction, that is, direction B. Because the holes 48 formed in the lug 47 of the trailing end of the film 29 are easily disengaged from the claws 45, the entire length of exposed film 29 is pulled out from the cassette 23 and fed into the processor section. The exposed film 29 is subjected to printing after development.

After the separation of the exposed film 29 from the film package 1, the film package 1 still contains the empty cassette 23 in the film take-up chamber 24. For the purpose of environmental protection and the reuse of resources, the film package 1 in this condition is returned to the factory of the film package maker. In the factory, the outer casing 3 is detached from the main body 20. Next, the holes 35 of the rear cover 22 are disengaged from the engaging claws 34 and the rear cover 22 is removed from the main body 20. Thereafter, it is checked whether the exposure mechanisms incorporated in the main body 20 such as the shutter, the film advancing mechanism, and the taking lens 8, can operate normally. If no defect is detected, the main body 20 is reused.

For reuse, the main body 20 is, after resetting the film frame counter 9 to its initial position, fed to an automatic assembly line together with new main bodies. On the automatic assembling line, the main body 20 is loaded with a new film, the battery 43 is replaced with a new one, and a new rear cover is mounted thereon. Finally, the main body 20 is encased in a new outer casing, and thus a new film package is produced. The rear cover 22 detached from the main body 20 is melted and is used as material for forming new rear covers or the like by molding. The old battery 43 is discarded.

Figure 8:
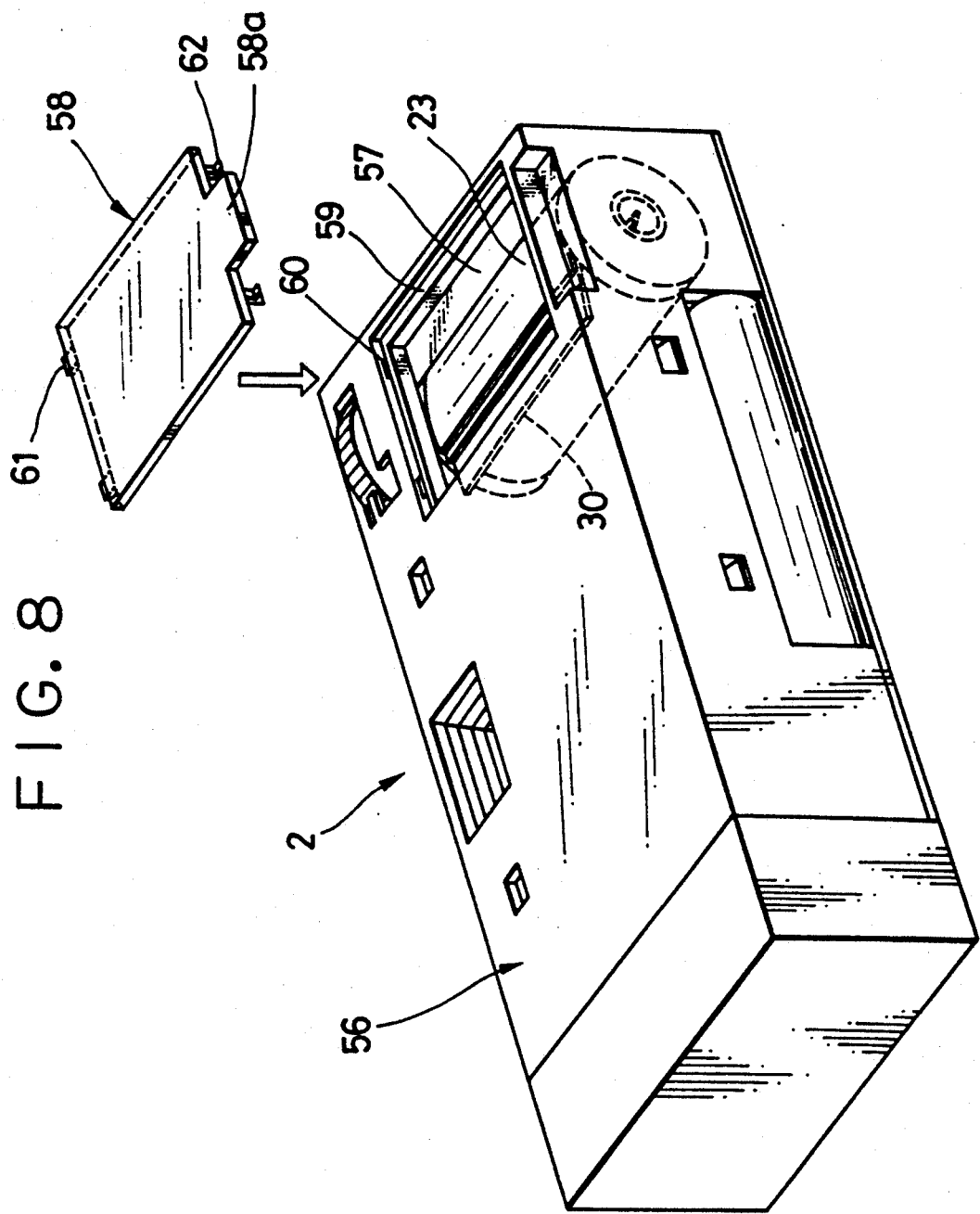
FIG. 8 is an exploded perspective view of a film package provided with a lid removably fitted on the rear side of the film take-up chamber, according to another embodiment of the invention.
Figure 9:
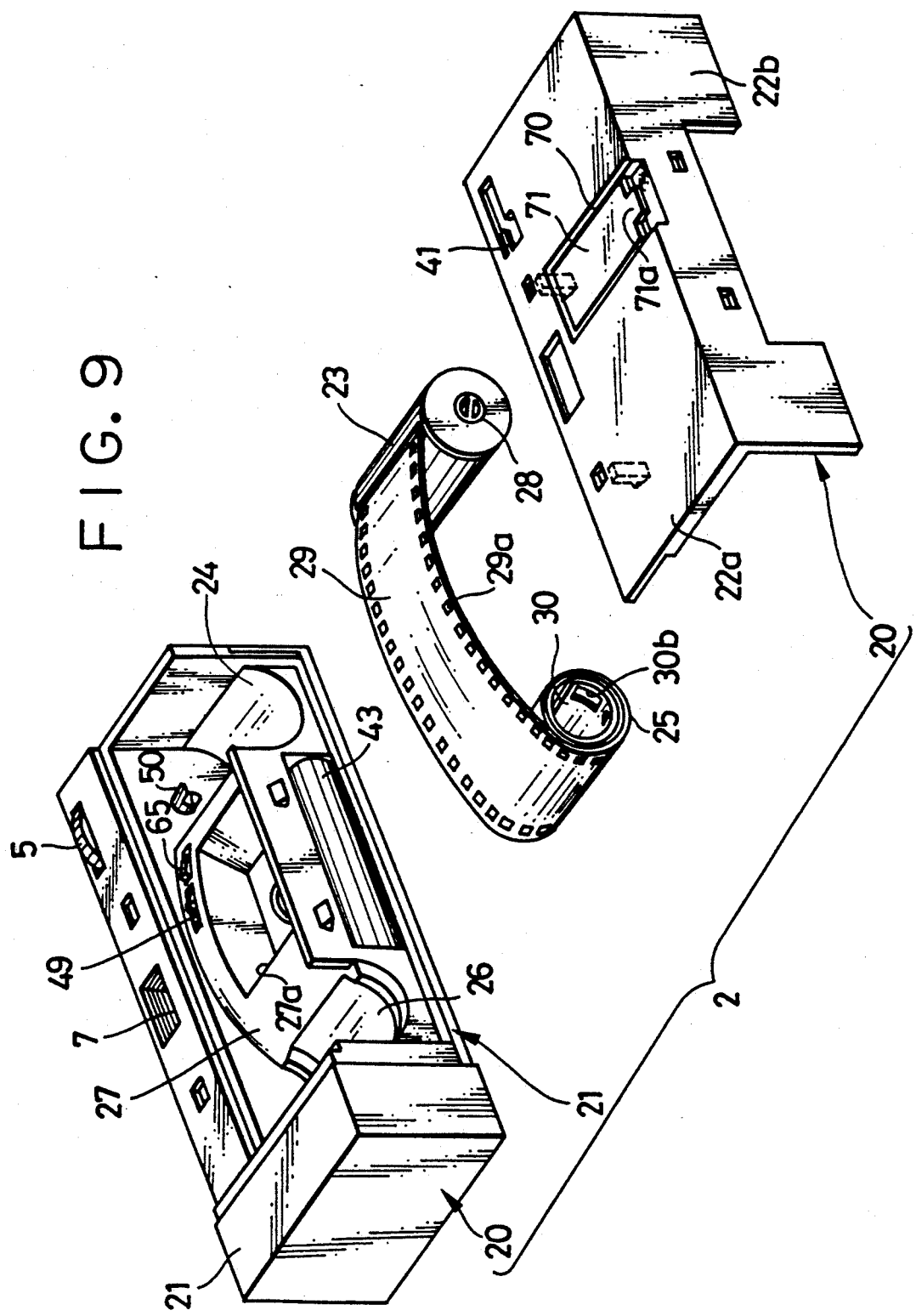
FIG. 9 is an exploded perspective view of a film package wherein the film end will not be wound into the cassette.
Figure 10:
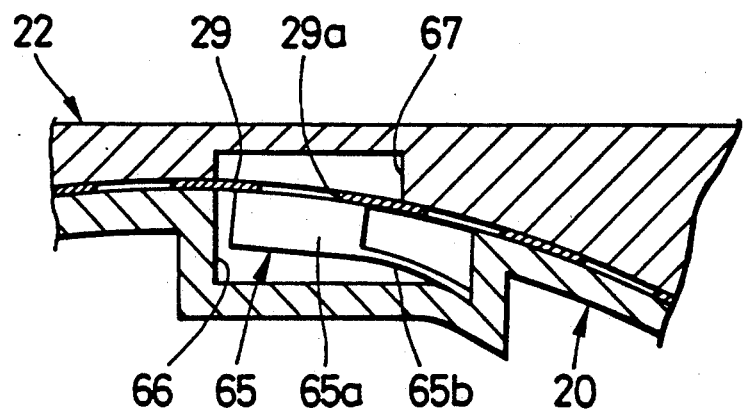
FIGS. 10 and 11 are enlarged sectional views showing the film arresting member before and after operation.
Figure 11:
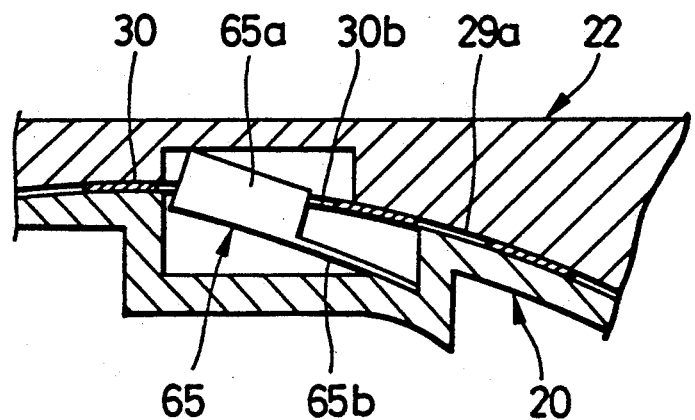

FIG. 8 shows a film housing 55 according to another embodiment of the present invention, in which the outer casing is omitted for clarity. In this film housing 2, a lid 58 is removably fitted over a film removal opening 57 of a rear cover 56. On the edge of the film removal opening 57, there is a stepped portion 59 slightly recessed from the outer surface of the rear cover 56 so as to augment the light-shielding effect of the lid 58. A pair of holes 60 is formed in the upper margin of the opening 57, while the lid 58 has a pair of projections 61 which are inserted in the holes 60. The lid 58 further has a pair of claws 62 which engage with corresponding recessed portions (not shown) formed inside the rear cover 56. A tab 58a of the lid 58 is provided to pull the lid 58 as to remove it from the rear cover 56 after tearing off a part of the outer casing. The lid 58 instead may be slidably fitted into the opening 57.

In order to prevent the film from being completely rewound into the film cassette 23, it is also possible, instead of forming the projections 30a integrally with the film 29, to attach a stick-like clip to the film leading end 30, or to adhere a plastic sheet wider than the film strip 29 to the leading end 30. It is of course possible to wind up the film completely in the cassette. In such a case, the film is pulled out from the cassette using a device for catching the leading end so as to pull out the film. Such devices are well known in the art.

FIGS. 9 to 12 show another embodiment of the film housing in which the leading end of the film cannot be wound back into the film cassette, wherein the same reference numerals designate the same or like parts as in FIG. 3. According to this embodiment, a film arresting member 65 for arresting the film is disposed beside the sprocket 49.

The film arresting member 65 comprises an arresting portion 65a and a spring portion 65b secured to the main body 20. The spring portion 65b continually urges the arresting portion 65a against the film 29, but the arresting portion 65a is larger than each perforation 29a both in length and in width, so that the arresting portion 65a will not engage in any perforation 29a. The main body 20 and the rear cover 22 are formed with recesses 66 and 67, respectively, which face each other such that the film arresting member 65 can move in a cavity formed by these recesses 66 and 67. In the leading end 30 of the film 29, there are two openings 30b one formed on each edge of the film 29 in alignment with the perforations 29a. The openings 30b are larger than the arresting portion 65a as well as the perforations 29a, so that the arresting portion 65a springs resiliently into either one of the openings 30b when the opening 30 rides over the arresting portion 65a, thereby arresting the film 29. It is to be noted that the film arresting member 65 may be disposed close to the film take-up chamber 24 so as to shorten the film length that is not wound into the film cassette 23.

Figure 12:
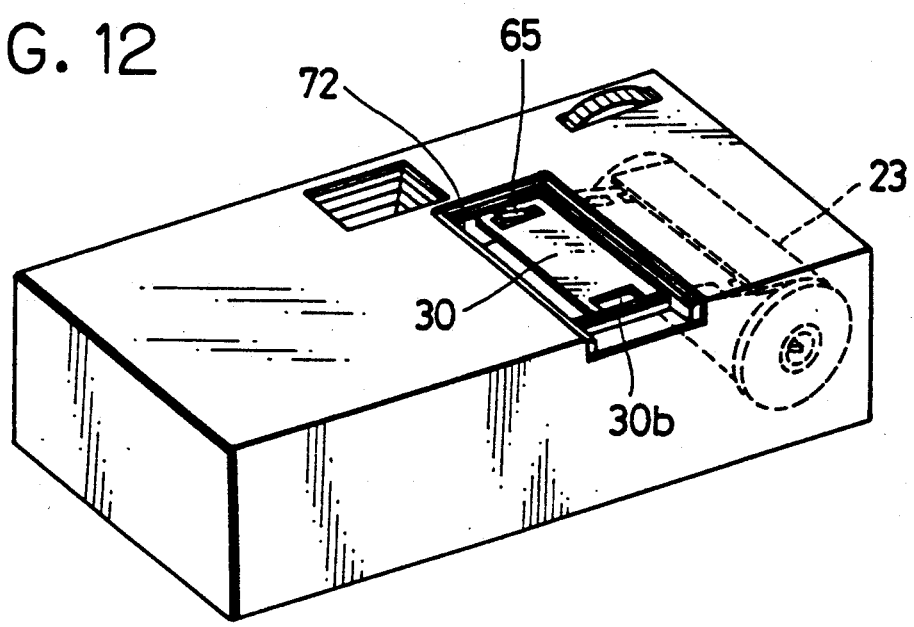
FIG. 12 is a perspective view of the film housing of FIG. 9 whose lid has been torn off therefrom after the completion of film winding.

In order to pull out the exposed film directly from the film package 1, a tear-off lid 71, which is bounded by a groove 70 providing a thin wall portion in the rear cover 22, is disposed in an area corresponding to the film arresting member 65. When a tab 71a of the lid 71 is pulled away from the rear cover 22, the lid 71 is torn off along the groove 70, so that a rectangular film removal opening 72 remains, as shown in FIG. 12. It is to be noted that the outer casing (not shown) will in this embodiment also have a perforation line surrounding an area corresponding to the lid 71 so as to facilitate removal of that portion of the outer casing that overlies lid 71.

When the film advancing wheel 5 is rotated after each exposure, the exposed film 29 is wound back into the cassette 23 one frame at a time and, at the same time, the sprocket 49 engaging with the perforations 29a is rotated by movement of the film 29, whereby the above-described shutter charging and other operations are performed. However, as noted above, the film arresting member 65, being larger than any perforation 29a, will not engage with any perforation 29a.

When the film advancing wheel 5 is rotated after the exposure of the last frame, the opening 30b rides over the film arresting member 65, and thus the arresting portion 65a moves into the opening 30b, whereafter the film 29 cannot be advanced, and the film advancing wheel 5 cannot be further rotated. As a result, the leading end 30 of the film 29 still protrudes somewhat from the mouth 23a of the cassette 23 when the film advancing or wind-up operation is terminated. The film package in this condition is forwarded to a photofinisher.

The photofinisher tears off a part of the outer casing thereby to expose the tab 71a, and pulls the tab 71a so as to tear off the lid 71 from the rear cover 22. Then, the leading end 30 exposed in this way is pulled out through the opening 72. In this condition, the film package 1 is set in a film processor wherein the entire length of exposed film 29 is drawn out and subjected to photographic processing. Thereafter, the film package 1 containing the empty cassette 23 is sent to a factory of the film package maker for reuse.

The lid 71 may extend over the film take-up chamber 24 as well as over the film arresting member 65. In this way, it becomes possible to turn the cassette 23 such that the exposed film 29 can be pulled out in a direction substantially perpendicular to the rear cover, and thus the film package 1 can be positioned in the film processor shown in FIG. 18.

Figure 13:
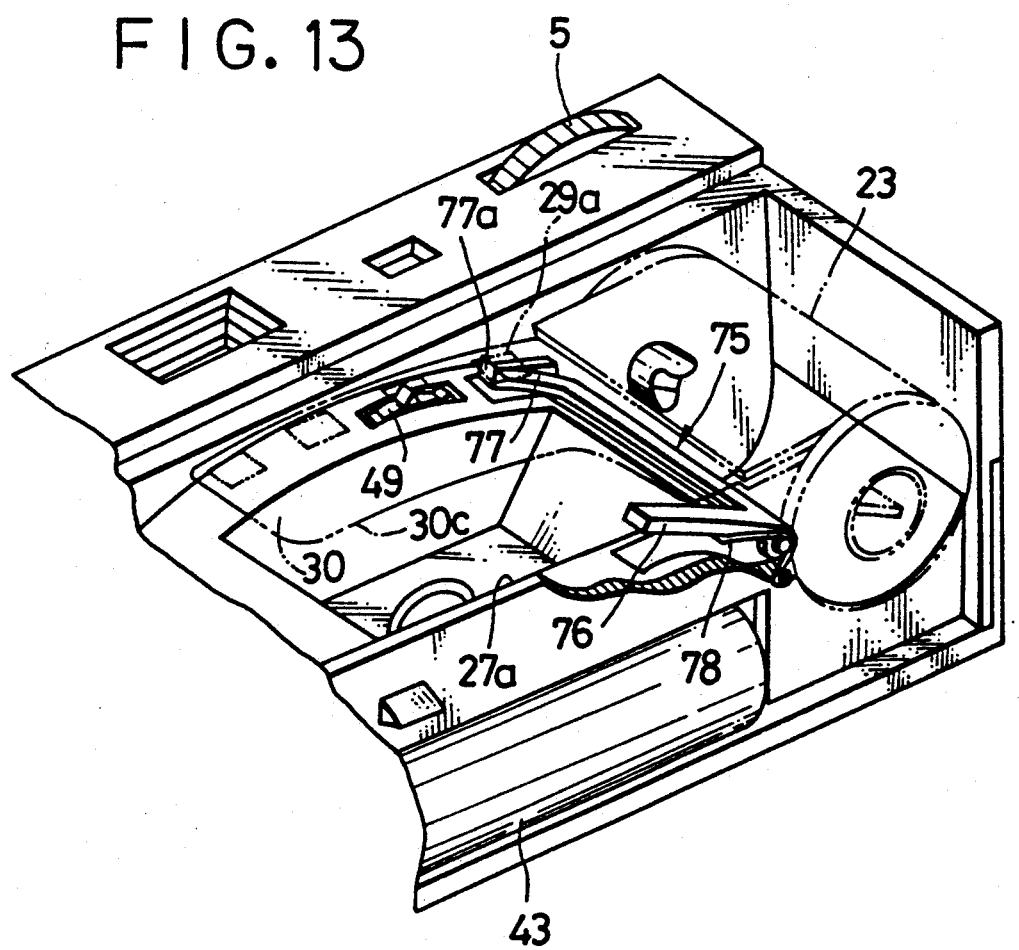
FIG. 13 is an enlarged fragmentary perspective view of a film take-up chamber showing another embodiment of a film arresting member.

Although the above-described embodiments suggest forming specific projections or openings in the leading end of the film so as to arrest the film, it is possible to detect the conventional cut-out 30c which is ordinarily formed in the film leader portion 30 of a conventional 135-type film, and to arrest, upon detection of the cut-out 30c, the film by a member cooperating with a film cut-out detecting member. FIG. 13 shows such an embodiment wherein a film arresting member 75 comprising a film detecting arm 76 and a claw arm 77 is pivotally mounted between the exposure opening 27a and the film take-up chamber 24. The arms 76 and 77 extend along upper and lower sides of the exposure opening 27a. The film arresting member 75 is urged by a spring 78 such that the film detecting arm 76 presses resiliently against the film 29. On the other hand, the claw arm 77 does not contact the film 29 so long as the film detecting arm 76 contacts the film 29, because the claw arm 77 has a smaller angle of inclination relative to the exposure opening 27a than the detecting arm 76. The detecting arm 76 is wider than the perforations 29a so as not to be trapped in any perforation 29a, while the claw arm 77 is narrower than the perforations 29a, and has a claw 77a on its free end which is adapted to engage in a perforation 29a.

During photographing, because the free end of the film detecting arm 76 is depressed by the film 29 extending over the exposure opening 27a, the claw 77a is held spaced form the film 29. When the film 29 is almost entirely wound back into the cassette 23, the film detecting arm 76 moves into the cut-out 30c, and thus springs up under the force of spring 78. Because the claw arm 77 also springs up, the claw 77a engages in a perforation 29a, thereby preventing further film advance. According to this embodiment, it is unnecessary to provide the film with a special construction for film arresting. Therefore, a conventional 135-type film cassette is usable in this embodiment.

Figure 15:
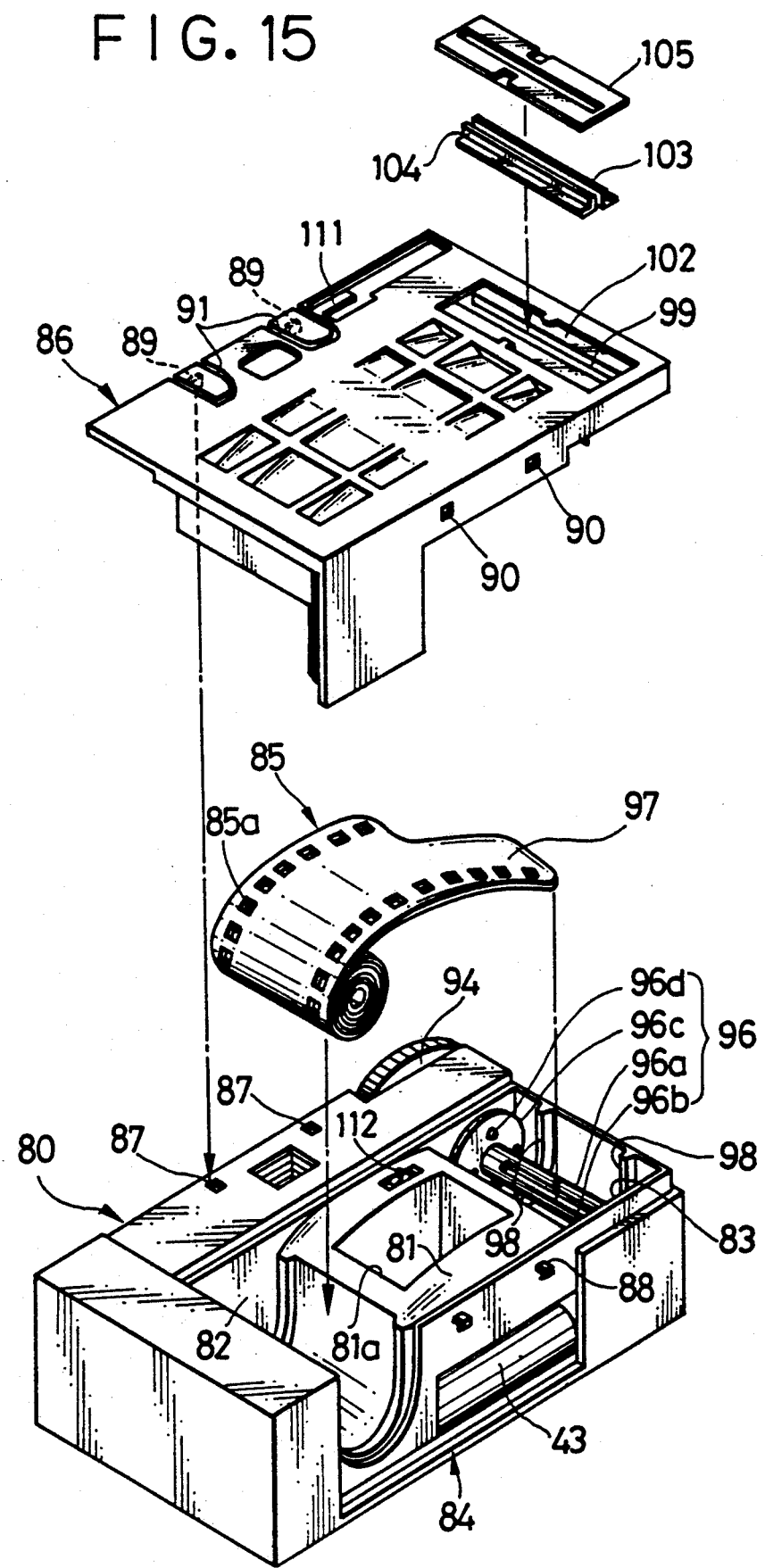
FIG. 15 is an exploded perspective view of a film package wherein a take-up spool is disposed in the film take-up chamber.

As is apparent from the foregoing description, the film arresting members shown in FIGS. 9 to 13 are of course applicable to conventional film packages wherein the cassette containing the exposed film is removed from the film package for development. Furthermore, because the film is reliably arrested before being rewound into the film take-up chamber, this embodiment can be applied to film packages wherein no film cassette is used, as shown in FIG. 15.

Figure 14:
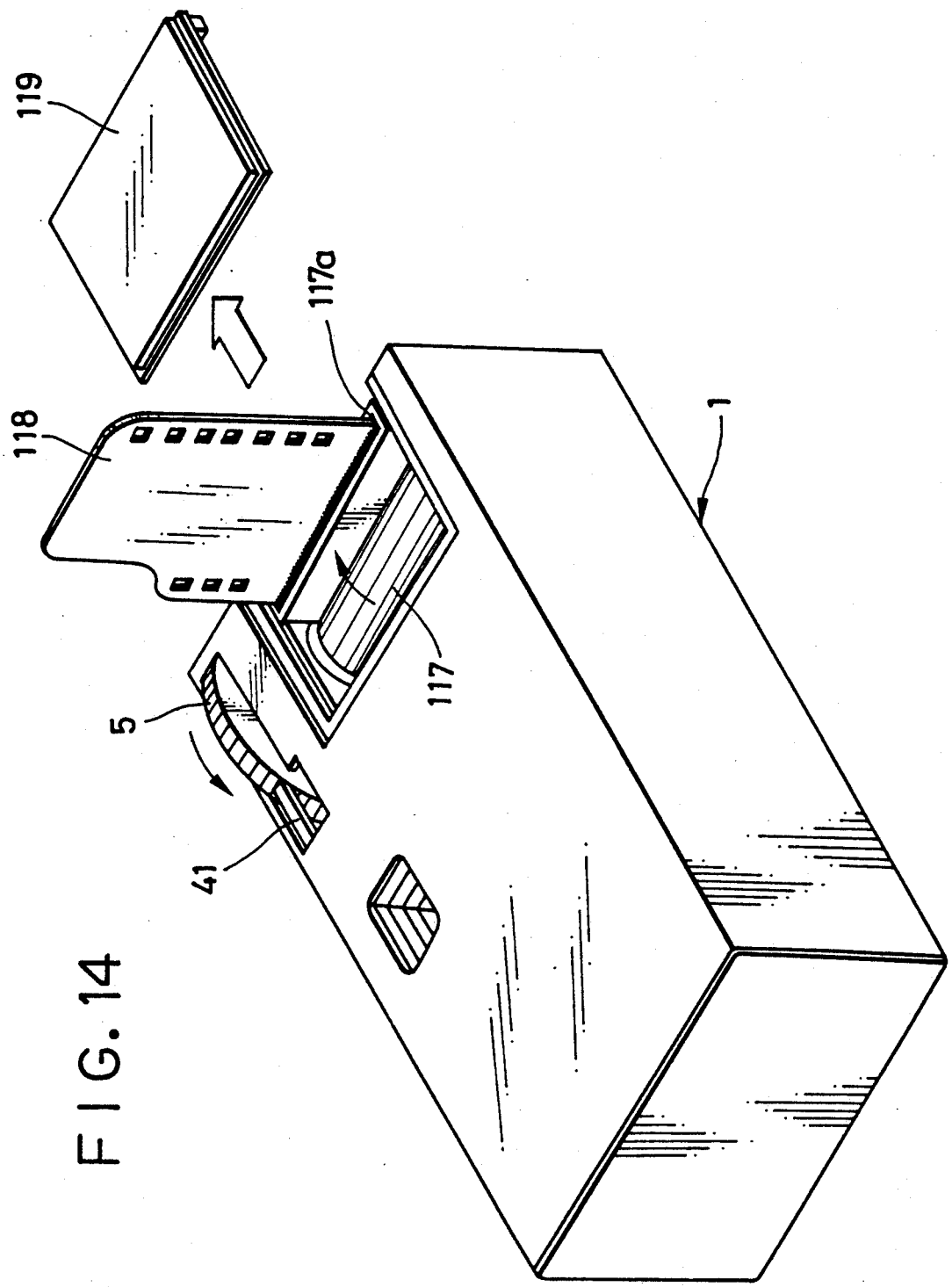
FIG. 14 is a perspective view of a film package containing a cassette from which the film can be fed out by rotating the spool.

FIG. 14 shows an embodiment using a film cassette from which the leader portion of the film contained therein can be fed out by rotating the spool of the cassette. In such a film cassette 117, as disclosed in Japanese Unexam. Patent Publ. No. 02-124564, an exposed film 118 is wound tightly on a spool (not shown), and the film roll is clamped at its both ends by a pair of flanges formed on both ends of the spool, or the outermost periphery of the film roll is pressed inwardly by a rib formed around and on the inner surface of the film cassette.

In this case, when removing the exposed film, a lid 119 is slid off to open a film opening after an overlying portion of the outer casing is torn off. Then, the film cassette 117 is rotated in the direction shown by an arrow, thereby to turn the position of a mouth 117a by 90°. When the film advancing wheel 5 is rotated in a direction shown by another arrow, after removal of the reversal preventing claw 41, the spool of the cassette 117 is rotated. Upon rotation of the spool, the film roll rotates without being unwound, so that the film leader portion 118, which is separated by an internal separating claw (not shown) from the next outermost turn of the film roll, is fed out from the cassette 117 through the mouth 117a. After the film leader portion 118 is fed out in this way, the cassette 117 containing the exposed film is positioned in a film processor for development. After the film is completely pulled out, the film package with the empty cassette is sent to a factory of the film package maker for reuse.

Although the lids according to the above embodiments are tear-off type or removable, it is possible to form a lid integrally with the rear cover 22 such that the lid is connected at one margin to the rear cover 22 through a thin wall portion, and thus pivotally openable. It is also possible to use a light-tight sheet covering the film take-out opening. The light-tight sheet is peeled or torn from the rear cover to permit removing the exposed film. The film removal opening may be disposed in one end of the film housing. In this case, the cassette is rotated by about 180° so as to direct the mouth of the cassette toward the film removal opening, whereafter the exposed film is pulled out sidewise from the film housing.

A conventional film package contains a cassette into which the exposed film is wound up, so that the exposed film in the cassette can be removed from the film package even in the light. However, if the exposed film is directly pulled out from the film package according to the present invention, then it is preferable to eliminate the cassette from a standpoint of cost, recovery and reuse of the film package. The user could hardly remove the bare exposed film from the film package, and so almost all film packages would be forwarded to the photofinisher without being disassembled or opened in any way.

Figure 16:
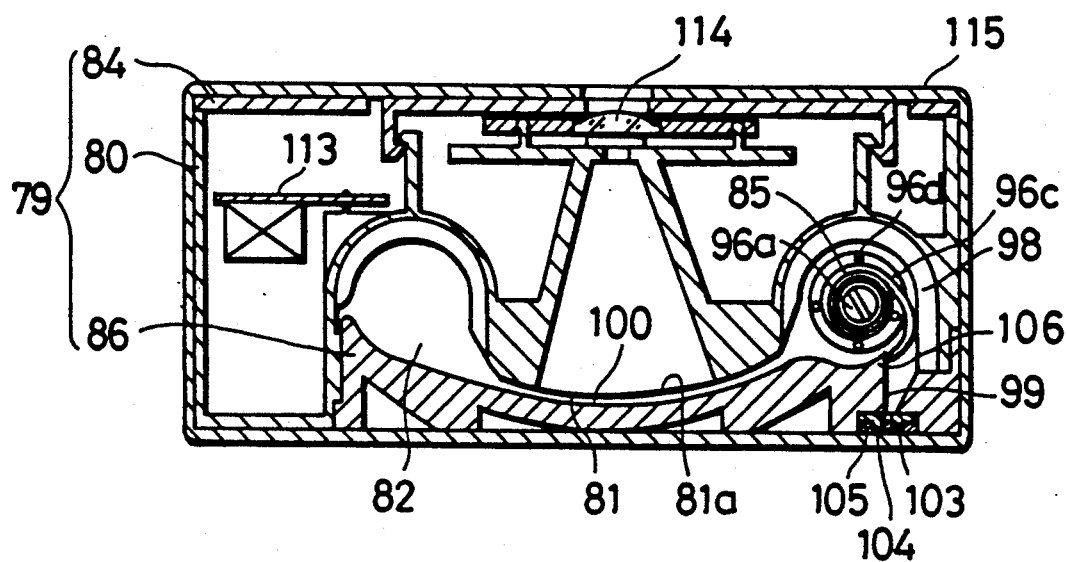
FIG. 16 is a horizontal section of the film package of FIG. 15.
Figure 17:
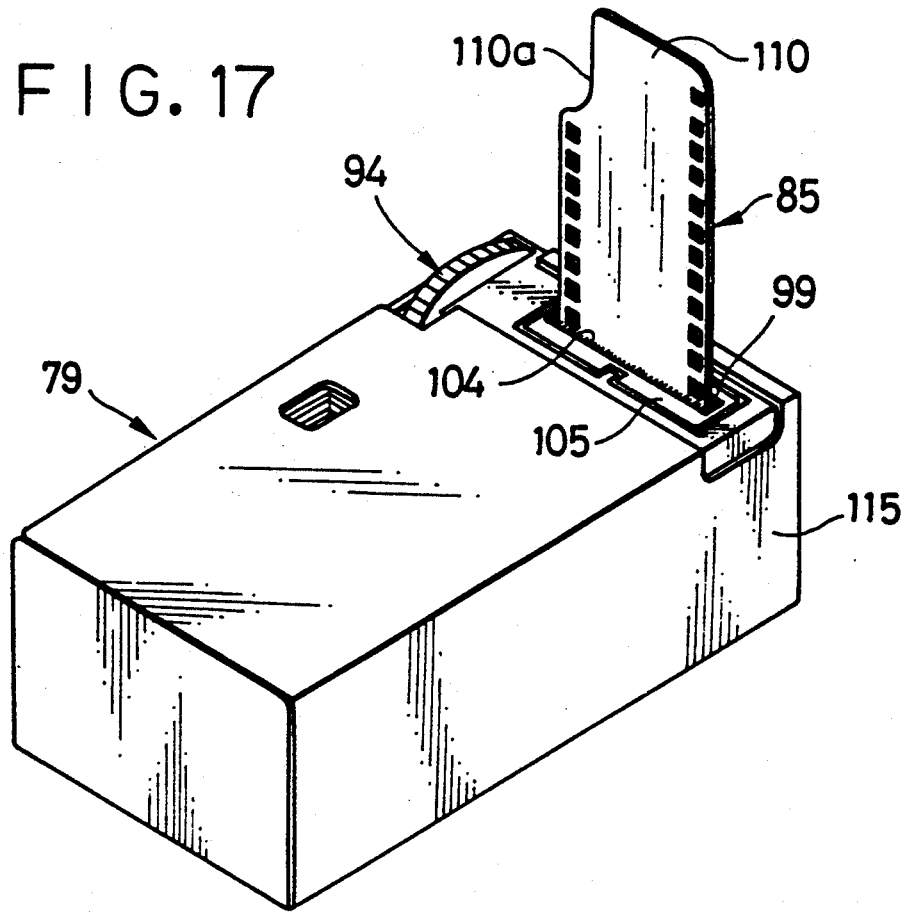
FIG. 17 is a perspective view of the film package of FIG. 15 wherein the film end is fed out from the film housing.

FIGS. 15 to 17 show a film package 79 wherein an exposed film is wound up on a take-up spool 96 in place of a film cassette. A main body 80 has an exposure frame 81, and a film supply chamber 82 and a film take-up chamber 83 on opposite sides of the exposure frame 81. The film supply chamber 82 receives an unexposed film 85 rolled up with no core or spindle, and the exposed film is wound up into the film take-up chamber 83. A front cover 84 is attached to the front of the main body 80. A rear cover 86 is removably attached to the rear of the main body 80 after the unexposed film 85 is loaded in the main body 80, so as to close the rear side of the main body 80 as well as the bottom of the film supply chamber 82 in light-tight fashion. The unexposed film 85 may instead be wound on an axle and positioned in the film supply chamber 82 in this condition. In this case, the axle should have such a construction that the trailing end of the film will be easily disengaged from the axle.

In order to attach the rear cover 86 removably to the main body 80, the main body 80 is formed with a pair of engaging holes 87 and a pair of engaging claws 88, while the rear cover 86 is formed with a pair of engaging claws 89 and a pair of engaging holes 90. Surrounding each engaging claw 89, a groove 91 is formed to provide a thin wall portion in the rear cover 86, so that the rear cover 86 can be torn off along the grooves for removal from the main body 80. The grooves 91 may be omitted if the engaging claws and holes 89 and 87 can otherwise be easily disengaged from each other.

As shown in FIG. 16, there is formed on the inner surface of the rear cover 86 a film guide surface 100 which is curved complementarily to the exposure frame 81 of the main body 80. Therefore, when the rear cover 86 is attached to the main body 80 after the film has been loaded, the film guide surface 100 gently presses the film 85 from the rear against the rear surface of the exposure frame 81, so that the film 85 disposed behind exposure opening 81a will not be loose or have ripples.

The take-up spool 96, which is disposed in the film take-up chamber 83 and is rotatable by a film advancing wheel 94, comprises an axle 96a on which the film 85 is wound, a slit 96b into which the film leader portion 97 having a smaller width than the remainder of the film strip is inserted, and a pair of flanges 96c for engaging and positioning both edges of the film 85. On the film side of each flange 96c, there are a plurality of rounded bosses 96d protruding inwardly and surrounding the film roll 85 wound on the axle 96a. Since the bosses are disposed in a circle whose diameter is slightly larger than that of the film roll 85 when fully wound up on the axle 96a, the bosses 96d gently press the upper and lower edges of the outermost turn of the fully wound film roll 85 radially inwardly, thereby to prevent unwinding of the film roll 85. Furthermore, the film take-up chamber 83 is formed on its inner wall surface with upper and lower ribs 98 which overlie the perforations 85a of the film 85 wound on the axle 96a. The ribs 98 guide the trailing end 110 of the film 85, that is, the end of the outermost turn of the film roll 85 wound on the axle 96a, toward a film removal slot 99 when the film 85 is fed out from the film package 79.

The film removal slot 99 is disposed on the rear side of the film 85 wound on the take-up spool 96. Recessed surfaces 102 on both sides of the film removal slot 99 support a pair of light-trapping fabrics 103 and 104 and a plate 105 for pressing the light-trapping fabrics 103 and 104 onto the recessed surfaces 102. The light-trapping fabrics 103 and 104, which are of plush, prevent ambient light from entering the film take-up chamber 83 through the slot 99. The light-trapping effect of the plush 103 and 104 is achieved by the pile of their thread, and the film 85 thrusts the pile thread aside when passing through the slot 99.

As shown in FIG. 16, a separating claw 106 is formed integrally with one of the walls forming the film removal slot 99, and protrudes into the film take-up chamber 83 such that the film trailing end 110 is caught by the separating claw 106, and is thus directed toward the slot 99. The trailing end 110 of the film 85 has a cut-out 100a so that the trailing end 110 will not be pressed by the rounded bosses 96d of the take-up spool 96 when the film 85 is fed out. Designated by 111, 112, 113, 114 and 115 are a reversal preventing claw, a sprocket, a circuit board for a flash unit, and an outer casing, respectively.

The operation of the embodiment shown in FIGS. 15 to 17 will be briefly described as follows:

When the film advancing wheel 94 is rotated, the exposed film 85 is wound up on the axle 96a of the take-up spool 96. During winding, both edges of the film 85 are guided radially inward by the rounded bosses 96d of the flanges 96c, whereby the outermost turn of the film 85 wound on the take-up spool 96 is always inside the circle on which the bosses 96d are disposed.

After the exposure of all the available frames, the film package 79 is forwarded to a photofinisher, whereupon the film advancing wheel 94 is rotated so as to confirm that the exposed film 85 has been completely wound up on the take-up spool 96, prior to removing the film. This can be judged depending on the torque required to rotate the film advancing wheel 94, as well as on the noise generated when the film trailing end 110 leaves the separating claw 106 and contacts the rib 98.

Next, a part of the outer casing 115 is torn off along a perforation line thereby to expose the pressing plate 105 and the slot 99. The reversal preventing claw 11 is broken away, and the film advancing wheel 94 is rotated in the reverse direction, whereby the exposed film 85 wound on the axle 96a rotates along with the take-up spool 96 without unwinding, because the rounded bosses 96b of the flanges 96c press the outermost turn of the film 85 radially inwardly.

But the film trailing end 110, thanks to the cut-out 110a, is not so urged by the bosses 96d, and thus protrudes outward from the flanges 96c. Therefore, the curled trailing end 110 moves along the rib 98, and is caught by the separating claw 106, and is thereby guided toward the film removal slot 99. Then, the trailing end 110 passes through the slot 99 while thrusting its way between the pile threads of the plush 103 and 104, and is then fed out from the film package 79. After feeding out the film end portion, the film package 79 is positioned in a film processor, and the exposed film 86 is fully pulled out for photofinishing, in the same way as for the preceding embodiments.

After removal of the exposed film 85, the film package 79 is returned to the film package maker for refitting and reuse. As described above, the outer casing 115 and then the battery 43 for the flash are removed. Thereafter, the rear cover 86 is pried open by a tool such as a screwdriver pushed into a gap between the engaging claws 88 and the engaging holes 90, whereby the rear cover 86 is broken along the grooves 91. In this way, the rear cover 86 is easily removed from the main body 80. The fragments surrounded by the grooves 91, bearing the engaging claws 89, are finally disengaged and removed from the main body 80. The main body 80 with the front cover 84 attached is reused as is, in the same way as described above, the rear cover 86 is melted after removal of the plus 103 and 104 and its material is recycled.

The film removal slot 99 may be located in one end of the main body 80. It is possible to expose the bottom end of the take-up spool 96 from the main body 80 so as to rotate the take-up spool 96 directly by rotating the bottom end. Instead of the plus 103 and 104, the film removal slot 99 may have a labyrinthine construction, or may be closed by an openable lid. In order to prevent unwinding of the film roll 85 on the take-up spool 96, it is possible to clamp the film roll by the flanges, or to design the ribs 98 so as to contact the outermost turn of the film roll 85. It is also possible to provide a resilient sheet for pressing against the outermost turn of the film roll 85.

The above described film packages can be developed in a film processor as shown in FIG. 18, wherein the film package 79 shown in FIGS. 15 and 17, for example, is positioned. The film processor comprises a film supply section 120, a film reservoir 121 and a photographic processing section 122. The film supply section 120 consists of a film package receiving section 123 in which the film package 79 is positioned, a leader sheet applying section 125 for applying a leader sheet 124, and a light-tight cover 126 for shielding these sections 123 and 125 from ambient light. The light-tight cover 126 is openably mounted on the film processor housing 128 by a hinge 127 about which it pivots.

Figure 20:
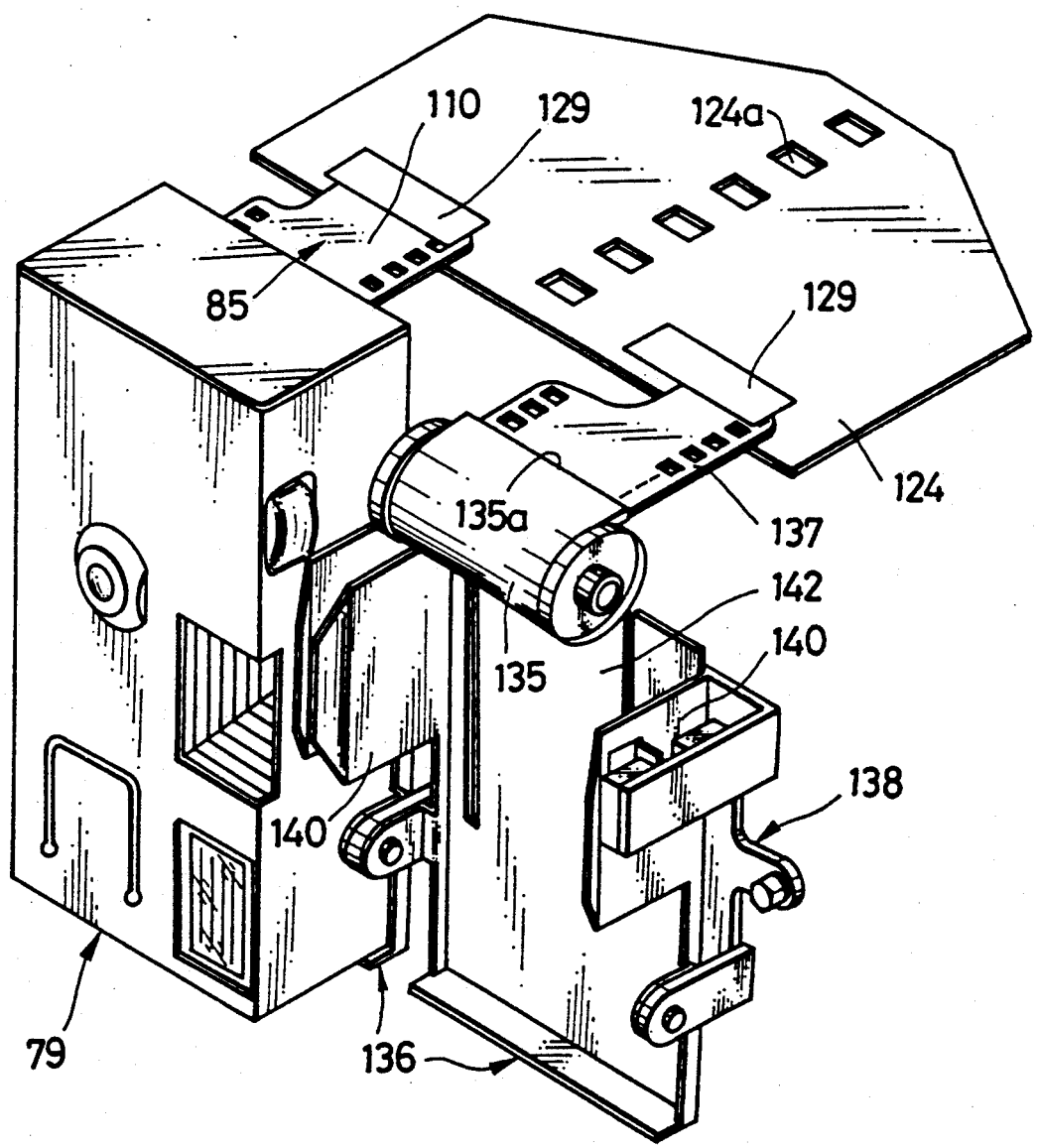
FIG. 20 is a perspective view showing the film package holder holding a cassette and a film package.
Figure 21:
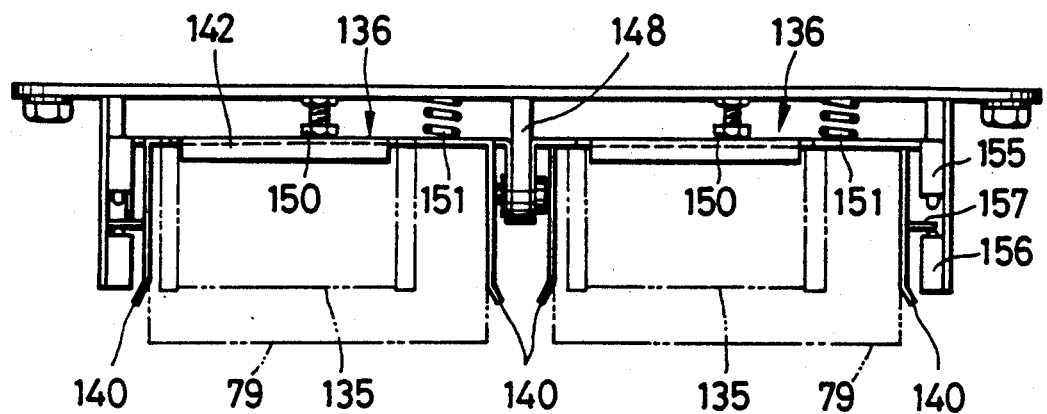
FIG. 21 is a plan view of the film package holder.
Figure 22:
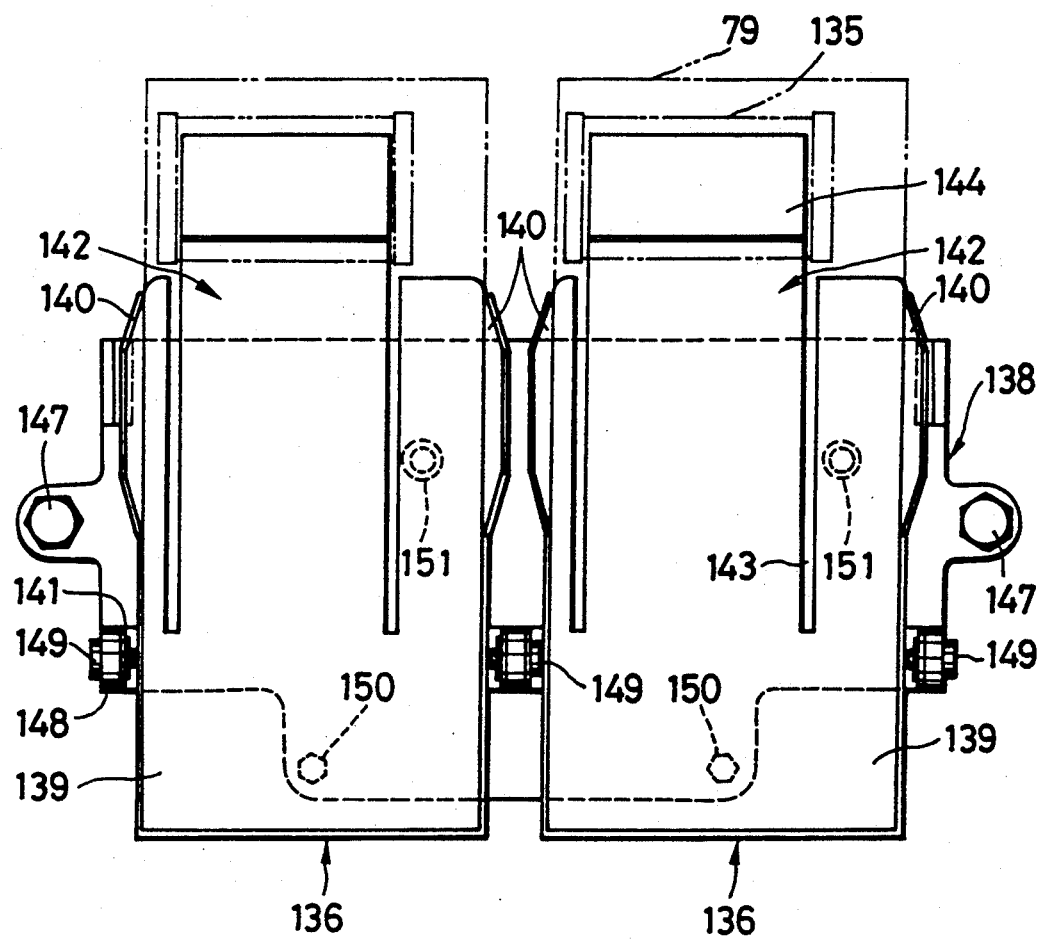
FIG. 22 is a front elevational view of the film package holder.

As shown in FIG. 20, the film package receiving section 123 has a film package holder 136 capable of holding both a film package 79 containing exposed film and a film cassette 135 containing exposed film. The end portions of the exposed films pulled out from the film package 79 and the cassette 135 are spliced to the leader sheet 124 by splicing tape 129. In this condition, the film package 79 and the cassette 135 are positioned on the film package holder 136. The leader sheet 124 has perforations 124a extending lengthwise along the center thereof. The perforations 124a engage with teeth of a sprocket 130, and thus the leader sheet 124 is transported to the film reservoir 121. In place of the sprocket 130, it is possible to use an endless belt having a line of teeth thereon.

The end of a film 137 contained in the film cassette 135 is hooked and pulled out by means of a film catching device which is inserted through the mouth 135a of the cassette 135, as is known in the art. On the other hand, the trailing end 110 of the film 85 contained in the film package 79 is fed out by rotating the film advancing wheel 94 in the reverse direction after breaking away the reversal preventing claw 111, as previously described.

Figure 19:
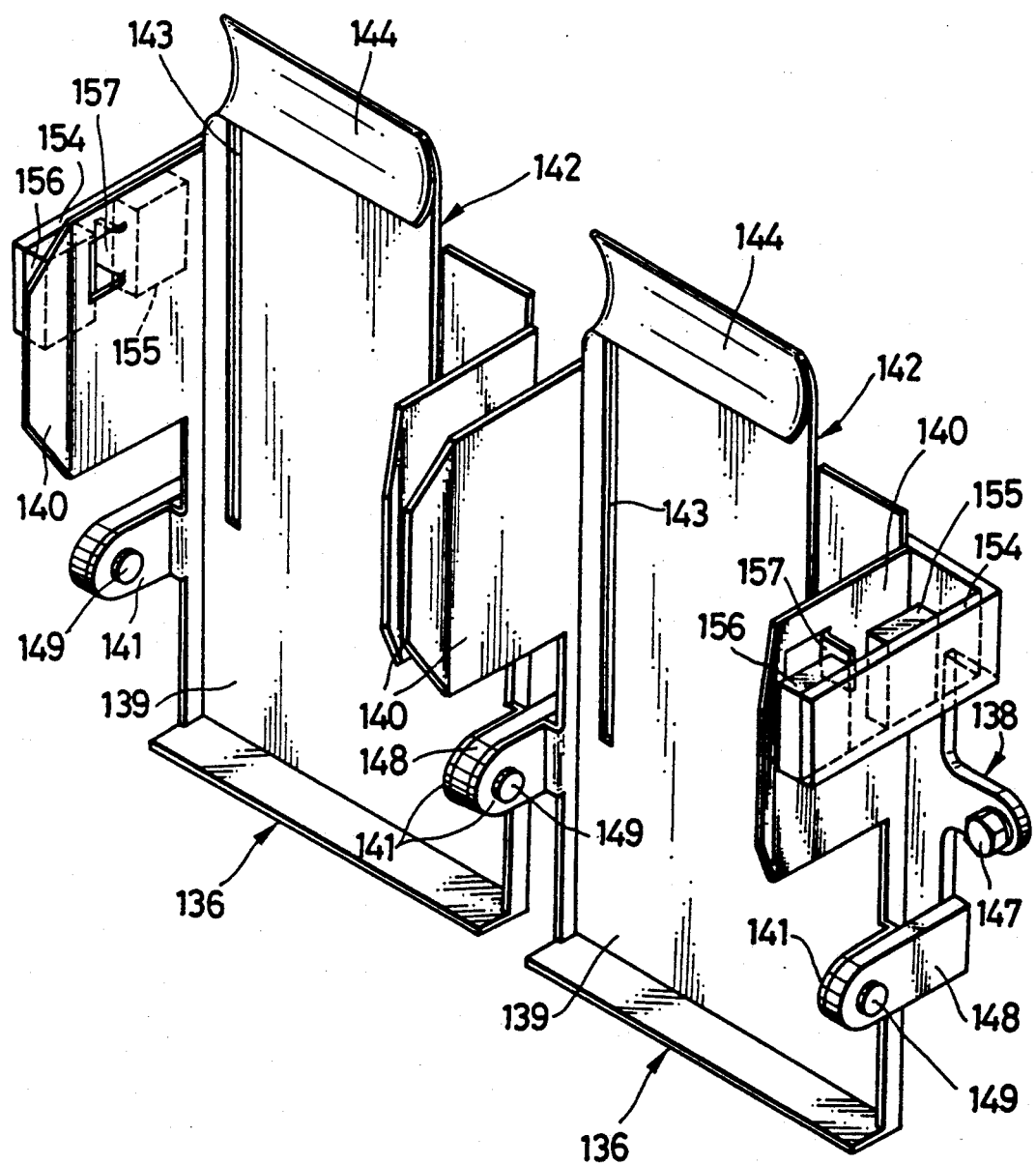
FIG. 19 is a perspective view of the film package holder.

FIGS. 19 and 20 show the details of the package receiving section 123, wherein two package holders 136 are rotatably held by a bracket 138. Each holder 136 comprises a rectangular base plate 139 and a pair of holding plates 140 disposed on opposite sides of the base plate 139 and extending perpendicular thereto. Since the spacing between the holding plates 140 of each pair is slightly less than the width of the film package 79, the film package 79 is pinched between the pair of holding plates 140.

Because the holder 136 thus holds the film package by pinching, it is desirable to standardize the width, that is, the vertical dimension of all kinds of film packages, if there are various kinds of film packages other than the abovedescribed built-in flash-type film package 79, such as close-up film packages, panoramic film packages and so forth. In this way, it becomes possible to hold any kind of film package by the holder 136. But until that time, the holder 136 preferably has a positioning member for each kind of film package, which can be selectively positioned on the base plate 139 so as to position the film removal slot of any kind of film package always at a predetermined position. To achieve the same object, in place of providing such a positioning member in the holder 136, it is possible to provide recessed portions or the like on the top and bottom walls of the film packages corresponding to the holding plate pair 140.

Each holder 136 also has a pair of mounting lugs 141 for rotatably mounting the holder 136 on the bracket 138. The mounting lugs are disposed below the holding plates 140 and extend perpendicular to the base plate 139. In the middle of the base plate 139, a cassette supporter 142 for supporting a film cassette 135 is formed by two slots 143 which give resiliency to the cassette supporter 142. Each cassette supporter 142 has a concave portion 144 curved complementary to the peripheral surface of the cassette 135. When the film package 79 is positioned in the holder 136, the cassette supporter 142 is pushed by the film package 79 toward the leader sheet applying section 125.

The bracket 138 is secured to the film processor housing 128 by screws 147, whereas the holders 136 are mounted on the bracket 138 with its mounting lugs 141 coupled by pins 149 to mounting lugs 148 of the bracket 138 protruding therefrom, such that the holders 136 are rotatable about the pins 149. Abutments 150 and coil springs 151 are disposed between the holders 136 and the bracket 138, so that the holders 136 mounted on the bracket 138 are normally substantially vertical.

The bracket 138 further has sensor supporting plates 154 formed on opposite sides thereof and extending parallel to the holding plates 140. On each sensor supporting plate 154, there is a film end detector 155 for detecting the film end and an initial position detector 156 for detecting that the holder 136 has returned to an initial position. According to the present embodiment, these detectors 155 and 156 are comprised by micro-switches, and are switched on and off by a contact lug 157 which is formed by cutting and bending a segment of the holding plate 140. It is possible to substitute photosensors or other sensors for the micro-switches.

The leader sheet applying section 125 is provided with a sheet applying plate 160 on which the leader sheet 124 is positioned. The sheet applying plate 160 has slots for receiving the sprocket 130 and a film feed roller 161 for transporting the film in accordance with the rotation of sprocket 130. A pinch roller 162 is pressed against the film feed roller 161 as to nip the film therebetween. The pinch roller 162 is mounted on the light-tight cover 126. Since the film 137 contained in the film cassette 135 is fitted at its trailing end to the spool of the cassette 135, as is known in the art, it is necessary to cut off the trailing end to enable delivering the film 137 into the photographic processing section 122. Therefore, a cutter 163 is disposed behind a film entrance 164 associated with each holder 136. It will be understood that because the trailing end of film 85 contained in the film package 79 slips off the take-up spool 96, it need not be cut by the cutter 168.

The film reservoir 121 disposed between the leader sheet applying section 125 and the photographic processing section 122, is intended to provide live storage of the film as a loop so as not to interrupt the film transport to the photographic processing section 122 even while the film is cut. The film loop is provided because of the difference between the film feeding speed in the film feeding section 120 and the film feeding speed in the photographic processing section 122, the latter being lower than the former. Instead of operating at different speeds, it is possible previously to draw out a certain length of film and hold it in the film reservoir 121 prior to supplying the film to the photographic processing section 122. It is also possible to draw out the entire length of a film from the film cassette 135 or the film package 79, and hold it in the film reservoir 121.

When the film processor processes a film package 79 and a film cassette 135 simultaneously, at first the film ends are fed out or pulled out from the film package 79 and the film cassette 135 in the above-described manner. Then, the film ends are secured to the leader sheet 124 by the splice tapes 129.

The light-tight cover 126 is opened as shown by chain-dotted lines in FIG. 18, thereby to position the leader sheet 124 on the sheet applying plate 160 such that the perforations 124a of the leader sheet 124 engage with the teeth of the sprocket 130. Next, the film package 79 is inserted between the pair of holding plates 140, whereas the film cassette 135 is hooked on the cassette supporter 142. Then, the light-tight cover 126 is closed.

Upon actuation of a start button, the sprocket 130 and the film feed roller 161 start rotating, thereby transporting the leader sheet 124 toward the film reservoir 121. As a result, the exposed films 85 and 137 are drawn out from the film package 79 and the film cassette 135 respectively through the film removal slot 99 and the mouth 135a. The films 85 and 137 are each temporarily stored by a constant length as a loop in the film reservoir 121 and, thereafter, are fed with the leader sheet 124 in the lead into the photographic processing section 122.

While being drawn out, the film 85 is automatically removed from the film package 79 because the leading end 97 of the film 85 slips off the take-up spool 96, so that the entire length of the film 85 is supplied to the photographic processing section 122. On the other hand, because the film 137 is secured to the spool of the cassette 135, the cassette 135 is tugged toward the photographic processing section 122 when substantially the entire length of film 137 has been drawn out from the cassette 135. As a result, the holder 136 holding the cassette 135 rotates about the pin 149 against the action of the spring 151, as shown by chain-dotted lines in FIG. 18, whereby the film end detector 155 on the side of the cassette 135 is switched on. Upon the film end detector 155 being switched on, the sprocket 130 and the film feed roller 161 stop rotating. Then, the cutter 163 associated with the holder 136 holding the cassette 135 is actuated to cut the film 137. Thereafter, the sprocket 130 and the film feed roller 161 again start rotating.

It will be understood that if the film package contains the same film cassette as the film cassette 135, the holder 136 holding that film package also rotates at the end of the film drawing out process in the same way as for the film cassette 135, so that the film end detector 155 is switched on thereby actuating the cutter 163 to cut the film.

Upon cutting the film 137, the empty cassette 135 falls down, and the holder 136 returns to the initial position under the action of the coil spring 151. When the initial position detector 156 detects that the holder 136 has returned to the initial position, an indication that the film drawing out process is completed is given to the operator by a buzzer or a display.

When the film drawing out processes are completed, the operator opens the light-tight cover 126, takes out the empty film package 79 and the empty cassette 135, and inserts a new film package and a film cassette. Needless to say, it is possible to position two film packages or two film cassettes in the film package receiving division 123. The disclosure of handling a film package 79 and a film cassette 1325 side by side is given solely to show that this is possible and not to imply that this need be done.

It is to be noted that the sprocket 130 and film feed roller 161 stop rotating when the light-tight cover 126 is opened.

The exposed films 85 and 137 supplied to the photographic processing section 122 are subjected to photographic processing while passing sequentially through various processing baths. Thereafter, the films 85 and 137 are dried in a dryer, and then hung by the leader sheet vertically in a well-known film stock apparatus.

The film processor as described above can draw out not only the film contained in the film package having no cassette, but also the film wound in the film cassette 23 within the film package as shown in FIG. 1. Although the film end detection is performed based on the pivotal movement of the holder 136, it is possible to detect the film end based on horizontal movement of the film. It may be possible to omit the film end detector and cutter if the film cassette as well as the film package are of the type wherein the film can completely slip out therefrom. The holder according to the above embodiment is applicable to a film splicing unit for splicing a large number of films together so as to form a long film roll. Although the cassette supporting portion 142 is designed to return to the initial position because of its own resiliency after being pushed by the film package, it is possible to urge the film supporting portion 142 toward the initial position by a spring.

Thus, the present invention should not be limited to the above-described embodiments, and various modifications within the scope and spirit of the appended claims will be apparent to people of ordinary skill in this technological field.

What is claimed is:

1. A film package holder for a film processor comprising:
    a film package holding portion for holding a lens-fitting photographic film package thereon, from which an end of an exposed film is pulled out through a film removal opening; and a cassette arresting portion for supporting a peripheral surface of a film cassette thereby to position a said film cassette at a film entrance of said film processor while an end of an exposed film contained in said film cassette is connected to film draw-out means.

2. A package holder as defined in claim 1, wherein said film draw-out means includes a leader sheet to which said film ends are connected, said leader sheet having perforations engaging with teeth of a film transporting member.

3. A package holder as defined in claim 1, wherein said film package holder is disposed near said film entrance, and is movable in a film transporting direction.

4. A film feeder for a film processor wherein lens-fitted photographic film packages with ends of exposed films pulled out therefrom and film cassettes with ends of an exposed film pulled out therefrom are adapted to be positioned while said exposed films are fed to a photographic processing section of said film processor, said film feeder comprising:
    leader sheet transporting means for transporting a leader sheet to said photographic processing section with said film ends of said exposed films connected to said leader sheet;
    a plurality of film package holders disposed at a film entrance of said film processor and aligned in a direction perpendicular to a film transporting direction, each said film package holer having a film package holding portion for positioning a said lens-fitted photographic film package at said film entrance of said film processor, and a cassette arresting portion for arresting a said film cassette at said film entrance when said leader sheet, to which said film end pulled out from said film cassette is connected, is positioned in said leader sheet transporting means;
    mounting means for mounting said package holders such that said package holders are movable in said film transporting direction independently of each other;
    movement detecting means for detecting movement of each said package holder in said film transporting direction; and
    a plurality of cutters each disposed near said film entrance in association with a said package holder, for cutting said exposed film when the movement of an associated one of said package holders is detected.

* * * * *